United States Patent
Sivaramakrishnan et al.

(10) Patent No.: US 10,721,220 B2
(45) Date of Patent: *Jul. 21, 2020

(54) DATA CUSTODIAN AND CURATION SYSTEM

(71) Applicant: Microsoft Technology Licensing, LLC, Redmond, WA (US)

(72) Inventors: Hari Sivaramakrishnan, Bellevue, WA (US); Roy Dsouza, Bellevue, WA (US); Lev Novik, Bellevue, WA (US); Nino Bice, Seattle, WA (US); David Robinson, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 377 days.

This patent is subject to a terminal disclaimer.

(21) Appl. No.: 14/866,774

(22) Filed: Sep. 25, 2015

(65) Prior Publication Data

US 2016/0021087 A1    Jan. 21, 2016

Related U.S. Application Data

(63) Continuation of application No. 13/159,658, filed on Jun. 14, 2011, now Pat. No. 9,147,195.

(51) Int. Cl.
*H04L 9/32* (2006.01)
*H04L 29/06* (2006.01)
(Continued)

(52) U.S. Cl.
CPC .............. *H04L 63/08* (2013.01); *G06F 21/10* (2013.01); *G06Q 20/085* (2013.01);
(Continued)

(58) Field of Classification Search
CPC .... G06F 21/78; G06F 12/1483; G06F 21/805; G06F 21/60; G06F 2221/2141;
(Continued)

(56) References Cited

U.S. PATENT DOCUMENTS 5,615,264 A    3/1997  Kazmierczak et al.
5,649,181 A    7/1997  French et al.
(Continued)

FOREIGN PATENT DOCUMENTS

CN    101452473 A    6/2009
CN    101523365 A    9/2009
(Continued)

OTHER PUBLICATIONS

"Third Office Action Issued in Chinese Patent Application No. 201280029351.4", dated Nov. 1, 2016, 6 Pages.
(Continued)

*Primary Examiner* — Farid Homayounmehr
*Assistant Examiner* — Lizbeth Torres-Diaz
(74) *Attorney, Agent, or Firm* — Ray Quinney & Nebeker PC; Thomas M. Hardman; Timothy J. Churna

(57) ABSTRACT

A data custodian and curation system may store data from a data supplier in encrypted form and may allow users to consume the data when the consumers obtain access to the data through an agreement. The curation system may manage access to the data, even allowing a consumer to use the data as if it were their own, but may track each usage of the data to implement a payment scheme or various usage restrictions. The curation system may encrypt downstream uses of the data and operate as a digital rights management system for the data. The custodian and curation system may operate as a cloud service that may contain encrypted data from many data providers but where the data providers may individually control access to their data in a managed system at any granular level.

20 Claims, 4 Drawing Sheets

(51) Int. Cl.
- *G06F 21/10* (2013.01)
- *H04L 9/14* (2006.01)
- *G06Q 30/02* (2012.01)
- *G06Q 20/08* (2012.01)

(52) U.S. Cl.
CPC ........... *G06Q 30/0201* (2013.01); *H04L 9/14* (2013.01); *H04L 63/0428* (2013.01); *H04L 63/105* (2013.01); *G06Q 2220/12* (2013.01); *H04L 2209/56* (2013.01)

(58) Field of Classification Search
CPC ......... G06F 2221/2129; G06F 21/6218; G06F 16/285; G06F 21/10; H04L 2209/60; H04L 2209/603; H04L 9/3263; H04L 63/04; H04L 63/0428
USPC .................................. 713/150–192; 726/1–33
See application file for complete search history.

(56) References Cited

U.S. PATENT DOCUMENTS

| | | |
|---|---|---|
| 5,819,273 A | 10/1998 | Vora et al. |
| 5,913,214 A | 6/1999 | Madnick et al. |
| 5,960,194 A | 9/1999 | Choy et al. |
| 6,016,348 A * | 1/2000 | Blatter .................. H04N 5/4401 348/E5.004 |
| 6,226,623 B1 | 5/2001 | Schein et al. |
| 6,343,287 B1 | 1/2002 | Kumar et al. |
| 6,556,986 B2 | 4/2003 | Hara et al. |
| 6,618,822 B1 | 9/2003 | Loaiza et al. |
| 6,928,425 B2 | 8/2005 | Grefenstette et al. |
| 6,938,021 B2 * | 8/2005 | Shear .................. G06Q 20/3674 705/67 |
| 7,007,275 B1 | 2/2006 | Hanson et al. |
| 7,124,101 B1 | 10/2006 | Mikurak |
| 7,168,034 B2 | 1/2007 | Hennings et al. |
| 7,177,874 B2 | 2/2007 | Jardin |
| 7,233,939 B1 | 6/2007 | Ziauddin |
| 7,472,349 B1 | 12/2008 | Srivastava et al. |
| 7,546,602 B2 * | 6/2009 | Hejlsberg .................. G06F 9/54 717/114 |
| 7,571,069 B1 * | 8/2009 | Farkas .................. G06Q 10/06 702/120 |
| 7,571,191 B2 | 8/2009 | Dill et al. |
| 7,594,109 B2 | 9/2009 | Minne |
| 7,647,349 B2 | 1/2010 | Hubert et al. |
| 7,668,821 B1 | 2/2010 | Donsbach et al. |
| 7,716,240 B2 | 5/2010 | Lim |
| 7,739,223 B2 | 6/2010 | Vaschillo et al. |
| 7,849,016 B2 | 12/2010 | So |
| 7,984,056 B1 | 7/2011 | Kane |
| 8,103,681 B2 | 1/2012 | Littlejohn et al. |
| 8,122,031 B1 | 2/2012 | Mauro et al. |
| 8,812,490 B1 | 8/2014 | Cappiello et al. |
| 9,122,720 B2 | 9/2015 | Bice et al. |
| 9,122,721 B2 | 9/2015 | Bice et al. |
| 9,128,979 B2 | 9/2015 | Bice et al. |
| 9,244,956 B2 | 1/2016 | Bice et al. |
| 2002/0023091 A1 | 2/2002 | Silberberg et al. |
| 2002/0120618 A1 | 8/2002 | Ushijima et al. |
| 2003/0009424 A1 * | 1/2003 | Ta .................. G06Q 20/123 705/51 |
| 2003/0135464 A1 | 7/2003 | Mourad et al. |
| 2003/0158767 A1 | 8/2003 | Nwafor et al. |
| 2004/0139024 A1 * | 7/2004 | So .................. G06Q 20/401 705/51 |
| 2004/0139089 A1 | 7/2004 | Wells et al. |
| 2004/0148278 A1 | 7/2004 | Milo et al. |
| 2004/0186826 A1 | 9/2004 | Choi et al. |
| 2005/0027675 A1 | 2/2005 | Schmitt et al. |
| 2005/0044064 A1 | 2/2005 | Haase |
| 2005/0196165 A1 * | 9/2005 | Dybsetter ........... G06F 12/1425 398/22 |
| 2006/0031266 A1 | 2/2006 | Colbeck et al. |
| 2006/0053077 A1 | 3/2006 | Mourad et al. |
| 2006/0112312 A1 * | 5/2006 | Dickenson .......... G06F 11/3636 714/28 |
| 2006/0129599 A1 | 6/2006 | Hammerich |
| 2006/0271557 A1 | 11/2006 | Harward et al. |
| 2007/0043667 A1 * | 2/2007 | Qawami .................. G06F 21/10 705/50 |
| 2007/0124313 A1 | 5/2007 | Kim et al. |
| 2007/0294178 A1 | 12/2007 | Pinder et al. |
| 2008/0059454 A1 | 3/2008 | Andrieu |
| 2008/0082448 A1 | 4/2008 | Meijer et al. |
| 2008/0082565 A1 | 4/2008 | Chang et al. |
| 2008/0104542 A1 | 5/2008 | Cohen et al. |
| 2008/0222132 A1 | 9/2008 | Pan et al. |
| 2008/0228716 A1 | 9/2008 | Dettinger et al. |
| 2008/0235288 A1 | 9/2008 | Ben Harush |
| 2009/0049200 A1 | 2/2009 | Lin et al. |
| 2009/0083408 A1 | 3/2009 | Hecht et al. |
| 2009/0177525 A1 | 7/2009 | Aaltonen et al. |
| 2009/0234823 A1 | 9/2009 | Wong |
| 2009/0307054 A1 | 12/2009 | D'imporzano et al. |
| 2010/0042460 A1 | 2/2010 | Kane, Jr. |
| 2010/0064354 A1 | 3/2010 | Irvine |
| 2010/0131775 A1 | 5/2010 | Jogand et al. |
| 2010/0138652 A1 * | 6/2010 | Sela ...................... G06F 21/445 713/158 |
| 2010/0185637 A1 | 7/2010 | Morris et al. |
| 2010/0205202 A1 | 8/2010 | Yang et al. |
| 2010/0250533 A1 | 9/2010 | Agro et al. |
| 2010/0293048 A1 | 11/2010 | Singolda et al. |
| 2011/0004829 A1 | 1/2011 | Olsen |
| 2011/0010379 A1 | 1/2011 | Gilderman et al. |
| 2011/0029520 A1 | 2/2011 | Leary et al. |
| 2011/0106911 A1 | 5/2011 | Sung et al. |
| 2012/0109941 A1 | 5/2012 | Cohen et al. |
| 2012/0159528 A1 | 6/2012 | Toney, Jr. |
| 2013/0104251 A1 | 4/2013 | Moore et al. |
| 2015/0339352 A1 | 11/2015 | Bice et al. |
| 2015/0379275 A1 * | 12/2015 | Fawaz .................. H04L 67/306 726/26 |
| 2016/0021087 A1 | 1/2016 | Sivaramakrishnan et al. |
| 2016/0140170 A1 | 5/2016 | Bice et al. |

FOREIGN PATENT DOCUMENTS

| | | |
|---|---|---|
| CN | 102055610 A | 5/2011 |
| EP | 2325766 A2 | 5/2011 |
| JP | 08255177 A | 10/1996 |
| JP | 11282878 A | 10/1999 |
| JP | 2000293590 A | 10/2000 |
| JP | 2002024262 A | 1/2002 |
| JP | 2002149459 A | 5/2002 |
| JP | 2004304304 A | 10/2004 |
| JP | 2004326250 A | 11/2004 |
| JP | 2009504026 A | 1/2009 |
| JP | 2010020524 A | 1/2010 |
| KR | 1020110047703 A | 5/2011 |
| RU | 2297665 C2 | 8/2005 |
| RU | 2316043 C2 | 1/2008 |
| WO | 2011051400 A1 | 5/2011 |

OTHER PUBLICATIONS

"Office Action Issued in Japanese Patent Application No. 2014-515869", dated May 30, 2016, 7 Pages.

"Data Cleansing & Enrichment", Sas, Retrieved from <<www.sas.com/software/data-management/entdiserver/data-quality.html>>, Retrieved on Apr. 7, 2011, 1 Page.

"Database Encryption in Oracle9i", Retrieved from <<http://www.cgisecurity.com/database/oracle/pdf/f5crypt.pdf>>, Feb. 2001, 11 Pages.

"Oracle Product Data Quality", Retrieved from <<https://web.archive.org/web/20150103161335/http://www.oracle.com/partners/en/most-popular-resources/059010.html>>, Retrieved on Apr. 7, 2011, 6 Pages.

(56) References Cited

OTHER PUBLICATIONS

"Securing Data at Rest: Developing a Database Encryption Strategy", Retrieved from <<https://web.archive.org/web/20110929141802/http://www.rsa.com/products/bsafe/whitepapers/DDES_WP_0702.pdf>>, Retrieved on Apr. 7, 2011, 15 Pages.
"Windows Azure Marketplace DataMarket", Retrieved from <<http://www.microsoft.com/windowsazure/Whitepapers/DataMarket/default.aspx>>, Oct. 2010, 9 Pages.
"Supplementary Search Report received for European Patent Application No. 12800000.7", dated Oct. 29, 2014, 4 Pages.
"Final Office Action Issued in U.S. Appl. No. 13/159,658", dated Oct. 1, 2013, 16 Pages.
"Non-final Office Action Issued in U.S. Appl. No. 13/159,658", dated Oct. 2, 2014, 24 Pages.
"Non-final Office Action Issued in U.S. Appl. No. 13/159,658", dated Dec. 20, 2012, 9 Pages.
"Notice of Allowance Issued in U.S. Appl. No. 13/159,658", dated May 27, 2015, 8 Pages.
"First Office Action Issued in Chinese Patent Application No. 201280029351.4", dated Aug. 18, 2015, 14 Pages.
Comerio, et al., "Service-oriented Data Quality Engineering and Data Publishing in the Cloud", In proceedings of IEEE International Conference on Service-Oriented Computing and Applications (SOCA), Dec. 13, 2010, pp. 1-6.
Damiani, et al., "Metadata Management in Outsourced Encrypted Databases", In Proceedings of Second VLDB Workshop, SDM 2005, Trondheim, Norway, Sep. 2, 2005, 17 Pages.
Farmer, Donald, "Deliver Rich Analytics with Analysis Services SOL Server", Retrieved from <<http://download.microsoft.com/download/3/2/F/32F05B83-DEE7-4076-A703-CD671A4DFOA9/AnalysisServices.ppt>>, Retrieved on Apr. 5, 2011, 5 Pages.
Mahmoudi, et al., "SDET: A Semantic Data Enrichment Tool Application to Geographical Databases", International Conference on Signal-Image Technology & Internet-Based Systems (SITIS'2006), IEEE, ACM, Hammamet, Tunisie., Dec. 2006, pp. 88-97.
"International Search Report & Written Opinion Issued in PCT Application No. PCT/US2012/040951", dated Jan. 17, 2013, 10 Pages.
Rotard, et al., "Semantic Lenses: Seamless Augmentation of Web Pages with Context Information from Implicit Queries", In Proceedings of Computers & Graphics, vol. 31, Issue 03, Dec. 22, 2006, 11 Pages.
Sion, Radu, "Towards Secure Data Outsourcing", In Book-Handbook of Database Security: Applications and Trends, Dec. 3, 2007, 23 Pages.
Yu, et al., "Achieving Secure, Scalable, and Fine-grained Data Access Control in Cloud Computing", In Proceedings of IEEE INFOCOM 2010, Mar. 14, 2010, 9 Pages.
Office Action Issued in European Patent Application No. 12800000.7, dated Mar. 11, 2016, 5 Pages.
"Second Office Action Issued in Chinese Patent Application No. 201280029351.4", dated Apr. 25, 2016, 07 Pages.
"Office Action Issued in Korean Patent Application No. 10-2013-7033265", dated Nov. 14, 2018, 25 Pages.
"Office Action Issued in European Patent Application No. 12800000.7", dated Oct. 24, 2018, 7 Pages.
"Office Action Issued in European Patent Application No. 12800000.7", dated Nov. 3, 2016, 5 Pages.
"Summons for Oral Hearing Issued in European Patent Application No. 12800000.7", Mailed Date: Dec. 5, 2017, 6 Pages.
"Automated Database Updater", Retrieved from: https://web.archive.org/web/20100910015028/http://autodbupdater.codeplex.com/, Sep. 10, 2010, 3 Pages.
"Office Action Issued in Korean Patent Application No. 10-2013-7033103", dated Aug. 27, 2018, 6 Pages.
"Office Action Issued in Korean Patent Application No. 10-2013-7033103", dated May 9, 2019, 5 Pages.
"Office Action Issued in Korean Patent Application No. 10-2018-7034381", dated Feb. 12, 2019, 4 Pages.
"Office Action Issued in Korean Patent Application No. 10-2019-7012452", dated May 9, 2019, 4 Pages.
"Office Action Issued in European Patent Application No. 12800161.7", dated Oct. 12, 2017, 13 Pages.
"Office Action Issued in European Patent Application No. 12800161.7", dated Oct. 23, 2014, 8 Pages.
"Office Action Issued in European Patent Application No. 12800161.7", dated May 14, 2018, 13 Pages.
"Office Action Issued in European Patent Application No. 12800161.7", dated Jan. 30, 2019, 19 Pages.
"Office Action Issued in European Patent Application No. 12800711.9", dated Jan. 4, 2016, 7 Pages.
"Summons to Attend Oral Proceedings in European Patent Application No. 12800711.9", Mailed Date: Jun. 21, 2016, 7 Pages.
"Supplementary Search Report Issued in European Patent Application No. 12800711.9", dated Mar. 25, 2015, 5 Pages.
"Final Office Action Issued in U.S. Appl. No. 13/159,654", dated Sep. 11, 2014, 30 Pages.
"Non Final Office Action Issued in U.S. Appl. No. 13/159,654", dated Nov. 21, 2013, 31 Pages.
"Notice of Allowance Issued in U.S. Appl. No. 13/159,654", dated Sep. 16, 2015, 12 Pages.
"Final Office Action Issued in U.S. Appl. No. 13/159,666", dated Feb. 25, 2014, 19 Pages.
"Non Final Office Action Issued in U.S. Appl. No. 13/159,666", dated Nov. 5, 2014, 19 Pages.
"Non-final Office Action Issued in U.S. Appl. No. 13/159,666", dated Jun. 21, 2013, 16 Pages.
"Non Final Office Action Issued in U.S. Appl. No. 14/166,437", dated Nov. 5, 2014, 28 Pages.
"Non Final Office Action Issued in U.S. Appl. No. 14/166,442", dated Nov. 6, 2014, 12 Pages.
"Final Office Action Issued in U.S. Appl. No. 14/816,547", dated Dec. 16, 2017, 21 Pages.
"Non Final Office Action Issued in U.S. Appl. No. 14/816,547", dated Jun. 30, 2017, 45 Pages.
"Non Final Office Action Issued U.S. Appl. No. 14/816,547", dated Oct. 13, 2016, 14 Pages.
"Non Final Office Action Issued in U.S. Appl. No. 15/005,352", dated Jan. 11, 2019, 18 Pages.
"Office Action Issued in Canada Patent Application No. 2,838,500", dated Apr. 17, 2018, 5 Pages.
"Office Action Issued for Australian Patent Application No. 2012271083", dated Aug. 2, 2016, 2 Pages.
"Office Action Issued in Australian Patent Application No. 2012271083", dated Aug. 26, 2016, 2 Pages.
"Office Action Issued in Australian Patent Application No. 2012271085", dated Nov. 15, 2016, 3 Pages.
"Office Action Issued in Australian Patent Application No. 2012271085", dated Aug. 25, 2016, 4 Pages.
"Third Office Action Issued in Australian Patent Application No. 2012271085", dated Nov. 29, 2016, 2 Pages.
"Office Action & Search Report Issued in Chinese Patent Application No. 201280029266.8", dated May 10, 2016, 13 Pages.
"Second Office Action Issued in Chinese Patent Application No. 201280029266.8", dated Jan. 22, 2017, 6 Pages.
"First Office Action and Search Report Issued in Chinese Patent Application No. 201280029313.9", dated Mar. 25, 2016, 14 Pages.
"Second Office Action Issued in Chinese Patent Application No. 201280029313.9", dated Nov. 18, 2016, 10 Pages.
"Office Action Issued for Russia Patent Application No. 2013155624", dated Jun. 28, 2016, 6 Pages.
"Office Action Issued in Russian Patent Application No. 2013155626", dated Jun. 28, 2016, 6 Pages. (W/O English Translation).
"Notice of Allowance Issued in Japanese Patent Application No. 2014-515867", dated Apr. 18, 2016, 3 Pages. (W/O English Translation).
"Office Action Issued in Japanese Patent Application No. 2014-515868", dated Apr. 13, 2016, 4 Pages.
"Office Action Issued in Australian Patent Application No. 2017200613", dated Oct. 23, 2017, 2 Pages.
"Office Action Issued in Canadian Patent Application No. 2838502", dated Apr. 30, 2018, 4 Pages.

(56) References Cited

OTHER PUBLICATIONS

Bouzeghoub, et al., "A Framework for Analysis of Data Freshness", In Proceedings of the International workshop on Information quality in information systems, Jan. 1, 2004, pp. 59-67.
"International Search Report & Written Opinion Issued in PCT Application No. PCT/US12/40947", dated Feb. 21, 2013, 10 Pages.
"International Search Report and Written Opinion Issued in PCT Application No. PCT/US2012/040950", dated Jan. 31, 2013, 10 Pages.
"Office Action Issued in Indian Patent Application No. 9355/CHENP/2013", dated Nov. 22, 2019, 6 Pages.
"Office Action Issued in Indian Patent Application No. 9357/CHENP/2013", dated Nov. 26, 2019, 8 Pages.
"Office Action Issued in Brazilian Patent Application No. BR112013031948-8", dated Nov. 11, 2019, 5 Pages.
"Office Action Issued in Brazilian Patent Application No. BR112013032101-6", dated Oct. 22, 2019, 5 Pages.

* cited by examiner

DATA CUSTODIAN AND CURATION SYSTEM

CROSS REFERENCE TO RELATED APPLICATIONS

This application is a continuation of and claims the benefit of and priority to U.S. patent application Ser. No. 13/159,658, entitled "Data Custodian And Curation System", filed Jun. 14, 2011 by Hari Sivaramakrishnan, the entire contents of which are expressly incorporated by reference

BACKGROUND

Data are a valuable commodity, but access to valuable data may be difficult to manage. When data are sold to a consumer, the data may be used by the consumer over and over, or even combined with other data and resold without the control or knowledge of a data owner. This may be because the data comes into the possession of the consumer and may not be traceable or controllable after possession is transferred.

In such cases, the data owner may only be able to sell or monetize the data in a single transaction, but not be able to monetize the data for other use scenarios.

SUMMARY

A data custodian and curation system may store data from a data supplier in encrypted form and may allow users to consume the data when the consumers obtain access to the data through an agreement. The curation system may manage access to the data, even allowing a consumer to use the data as if it were their own, but may track each usage of the data to implement a payment scheme or various usage restrictions. The curation system may encrypt downstream uses of the data and operate as a digital rights management system for the data. The custodian and curation system may operate as a cloud service that may contain encrypted data from many data providers but where the data providers may individually control access to their data in a managed system at any granular level.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
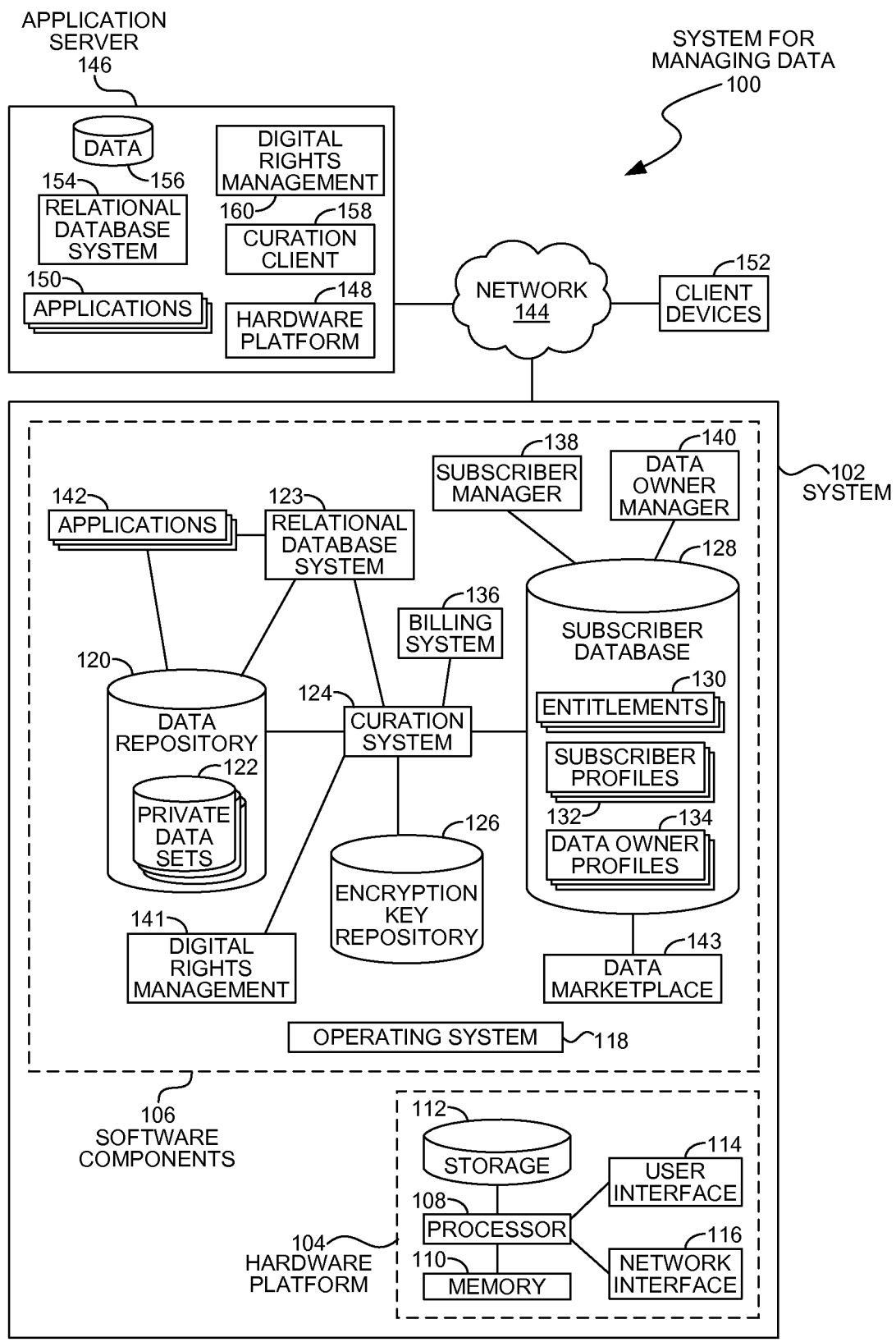
FIG. 1 is a diagram of an embodiment showing a network environment with a data management system.

A data management system may permit users to purchase and use data while keeping the data within a controlled system. The data may be encrypted and managed so that each access to the data may be monitored and controlled. In many embodiments, the source data may be maintained and tracked within the data repository so that access by other parties may be monitored and controlled.

The data management system may be considered an ecosystem in which data may be shared and consumed while maintaining the data in a secured manner. Each portion of data may be combined with other data sets to deliver data intensive applications. Each data source may be maintained in its original location and state, and each access to the data source may be tracked for billing and access control.

The data management system may have a relational database management system that various applications may use. Within the relational database management system, application databases may be created that access tables, columns, rows, elements, or other database components that may be owned by data owners. Each of the database components may be separately encrypted and a curation system may provide keys to decrypt the data when requested.

The ecosystem may enable data to be shared at different granularities and for different conditions, each of which may be managed by an entitlement or agreement to allow access. For example, an entitlement may permit access to a specific table of data on a per-access price. Another entitlement may permit access to a column of data for a predetermined period of time, regardless of the number of accesses.

Data provenance may be provided to a consumer when an application uses data provided from a data owner. The encryption keys used to lock the source data may be provided to the consumer as evidence that the source data did indeed come from the source. Such provenance may be maintained even when multiple parties process the data within the ecosystem.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100, showing a system 102 that may provide a data ecosystem in which data may be shared while maintaining control of the data by the data owner. Embodiment 100 is a simplified example of a data ecosystem that manages data.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 illustrates one version of a system for managing data. Data may be sold by-the-use, while maintaining control and provenance of the data. An encryption system may encrypt each salable unit of data and access to the data may be monitored and controlled by each request for a key to decrypt the data.

Various data owners may make their data available to other users through an entitlement, which may entitle a user to access the data according to various predefined rules. The entitlement may be considered an access contract that defines the metes and bounds of the data the user may access.

The data may be maintained in a single location. A relational database system may permit users to create applications that include controlled data in their databases, but where each access to the controlled data may be monitored and logged.

Throughout this specification and claims, the term "private data" may be any data owned by a data owner for which access may be restricted and managed. In many embodiments, a data owner may make their data available for purchase or for access under restricted conditions.

In many embodiments, a data user may be a business that executes an application that consumes data. The application may have a database against which queries may be executed, and the database may contain one or more tables, rows, columns, or cells of data that are private data. When the application developer creates their database, the application developer may create links within the application database to private data.

The private data may be separately encrypted for each unit of data that may be made available. In some embodiments, the unit of data may be a group of tables, a single table, a set of rows or columns in a table, specific cells within a table, or some other unit of data in the database.

When an element of the private data is accessed, the relational database management system may determine that the data are encrypted, and may request an encryption key. An encryption key repository may contain a key that may be used to decrypt the private data and make the data available.

A curation system may manage the access to private data. The curation system may identify an access, ensure that the access is permitted by an existing entitlement, then may retrieve a key for decrypting the data. In cases where the access is billed on a per-access basis, the curation system may use a billing system to create a billable event.

The data encryption may be performed in a format preserving manner in some cases. Format preserving data encryption may result in an encrypted version of a data element where the encrypted version may have the same data type as the original version.

In some embodiments, some data elements may be encrypted in a non-format preserving manner. Such embodiments may be useful when the data have data types that are not amenable to format preserving encryption or where the data are to be protected using higher levels of security.

In many embodiments, the system may be able to track derived data which may contain or be derived from private data. When derived data are present, the derived data may be encrypted and managed in the same manner as the original private data. Such embodiments may preserve the private data even though the private data may be merged or transformed with other data.

As data are used by one or more applications, the provenance of the data may be verified with the data management system. When each of the transformations of data are preserved using the data management system, a consumer may request a verified provenance of the data. The consumer may receive a public encryption key from the data owner that may be used to verify that the data are indeed from the data owner. The public encryption key may be used to decrypt some or all of the private data, or a token or other identifier associated with the private data. In some instances, such a token may be known as an authentication token.

Data provenance may be useful in applications where high value data are used. An application that uses data from a trusted and costly source may wish to advertise that their data came from a trusted source, and may be able to verify the source to the consumer.

Many embodiments may include analytics that may be used by a data owner. The analytics may include who used the data, which data elements were accessed, how and when the data were used, and other information. The analytics data may be useful for monitoring, marketing, and monetizing the data to notice trends, highly used data, or other information.

The system of embodiment 100 is illustrated as being contained in a single system 102. The system 102 may have a hardware platform 104 and software components 106.

The system 102 may represent a server or other powerful, dedicated computer system that may support multiple user sessions. In some embodiments, however, the system 102 may be any type of computing device, such as a personal computer, game console, cellular telephone, netbook computer, or other computing device.

The hardware platform 104 may include a processor 108, random access memory 110, and nonvolatile storage 112. The processor 108 may be a single microprocessor, multi-core processor, or a group of processors. The random access memory 110 may store executable code as well as data that may be immediately accessible to the processor 108, while the nonvolatile storage 112 may store executable code and data in a persistent state.

The hardware platform 104 may include user interface devices 114. The user interface devices 114 may include keyboards, monitors, pointing devices, and other user interface components.

The hardware platform 104 may also include a network interface 116. The network interface 116 may include hardwired and wireless interfaces through which the system 102 may communicate with other devices.

Many embodiments may implement the various software components using a hardware platform that is a cloud fabric. A cloud hardware fabric may execute software on multiple devices using various virtualization techniques. The cloud fabric may include hardware and software components that may operate multiple instances of an application or process in parallel. Such embodiments may have scalable throughput by implementing multiple parallel processes.

The software components 106 may include an operating system 118 on which various applications may execute. In some cloud based embodiments, the notion of an operating system 118 may or may not be exposed to an application.

A data repository 120 may contain many private data sets 122. The private data sets 122 may include a separate data set for each unit of data that may be separately tracked and managed. Each private data set may be encrypted with a different encryption key, and the encryption keys may be stored and managed in an encryption key repository 126.

A curation system 124 may manage the private data sets 122 and provide encryption keys from the encryption key repository 126 to decrypt the various private data sets 122, among other functions. The curation system 124 may operate with a relational database system 123, where the relational database system 123 may identify an encrypted private data set 122 and request access to the curation system 124.

The relational database management system 123 may be accessed by various applications 142 that may use and manipulate one or more of the various private data sets 122.

The curation system 124 may access a subscriber database 128 to determine if any entitlements 130 exist from which access may be granted, then retrieve an encryption key. The curation system 124 may also interact with a billing system 136 to track access to a private data set 122 when an entitlement is in place that causes a billing event to occur with an access.

In some embodiments, the curation system 124 may operate with twice encrypted keys. In one such embodiment, a data user or data owner may encrypt an encryption key for a private data set with a second encryption key. In such embodiments, the curation system 124 may provide an encryption key that may be encrypted with a second encryption key known by the data owner or data user. The data owner or data user may then decrypt the encryption key to gain access to the key used to decrypt the data.

Such embodiments may be useful in protecting access to the private data sets 122 from the operator of the system 102. The double encryption may use a private key known by a data owner or data user to ensure that the operator of the system 102 does not have full access to all the encryption keys in the encryption key repository 126.

The subscriber database 128 may include subscriber profiles 132 and data owner profiles 134. The subscriber profiles 132 may include login information, billing information, and other data that may be used to create an entitlement 130. Similarly, the data owners may have data owner profiles 134 that may be used to manage the data being made available.

A subscriber manager 138 may be an interface through which a subscriber may establish and maintain a subscriber profile 132. The subscriber manager 138 may also assist a data user in finding data that may be available for purchase and use. Some embodiments may have a data marketplace 143 which may be a web based or other shopping mechanism whereby a data user may identify the data to be consumed, then the data marketplace 143 may establish an entitlement 130 that gives access to the data user.

The data owner manager 140 may be an interface through which a data owner may identify data to share, configure the various private data sets 122, and establish terms and conditions for various entitlements. The data marketplace 143 may present the private data sets to prospective data users, as well as the terms and conditions for entitlements.

In some embodiments, a digital rights management system 141 may permit or deny access to certain private data sets. In some cases, the private data sets 122 may be copied to a second location and used with another relational database management system. In such cases, the digital rights management system 141 may apply protection to the data, and a corresponding digital rights management system may permit or deny access to those data according to the applicable entitlements.

The system 102 may be connected to a network 144 to which various client devices 152 and other application servers 146 may be attached. A client device 152 may be any type of device that may access one of the applications that may use the private data sets 122. In some cases, the client devices 152 may also be used by a data owner or data user to access the data owner manager 140 or subscription manager 138, respectively.

The client devices 152 may be any network connected device. In some cases, the client devices 152 may be personal computers, server computers, mobile telephones, game consoles, laptop computers, tablet computers, or any other network enabled device.

Some embodiments may use an application server 146 to operate in conjunction with the system 102. The application server 146 may have a hardware platform 148, which may be similar to the hardware platform 104 or may be a cloud based fabric.

The application server 146 may have applications 150 that may access the relational database system 123 of the system 102 or may access a local relational database system 154.

In some embodiments, the application server 146 may request private data sets 122 from the system 102 and may have the requested private data sets 122 transmitted to be stored in local data 156. In such embodiments, the private data sets may remain encrypted during transmission and storage. In order to access the private data sets stored in the local data 156, a curation client 158 may operate in conjunction with the curation system 124 to retrieve an encryption key to decrypt the local data 156 for use. In other embodiments, the private data sets may be transmitted using digital rights management. In such embodiments, a digital rights management system 160 may permit or deny access to the private data sets.

Figure 2:
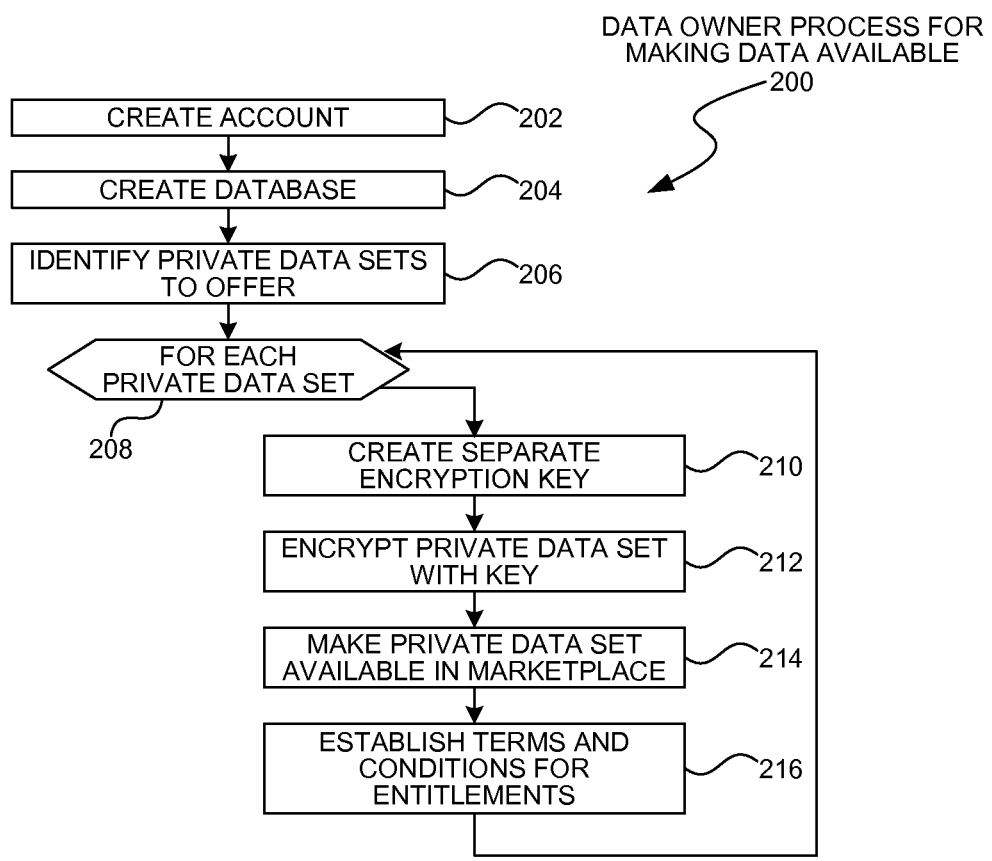
FIG. 2 is a flowchart of an embodiment showing a method for making data available by a data owner.

FIG. 2 is a flowchart illustration of an embodiment 200 showing a method for making data available. Embodiment 200 is a simplified example of a method that may be performed by a data owner to identify and prepare private data for use.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 is a simplified example of the steps performed when a data owner may make private data available within a data management system. The operations of embodiment 200 may be performed using a data owner manager interface, such as the data owner manager 140 of embodiment 100.

In block 202, an account may be created. The account may include various data about the data owner, including any access authorization that the data owner may have for the data that may be shared.

In block 204, the data owner may create their database. In some embodiments, the database may be preexisting and the data owner may copy the database into a data management system for dissemination.

The data owner may identify private data sets in block 206. The private data sets may be any unit of data that the data owner may wish to make available through a data management system. In some cases, the private data sets may be one or more tables, columns, rows, individual elements, or some other unit of a database.

For each private data set in block 208, a separate encryption key may be created in block 210 and used to encrypt the private data set in block 212.

After the private data set is encrypted, the private data set may be made available in a marketplace in block 214. The terms and conditions of any entitlements may be defined in block 216 and also included in the marketplace. The process may return to block 208 to process any additional private data sets.

Figure 3:
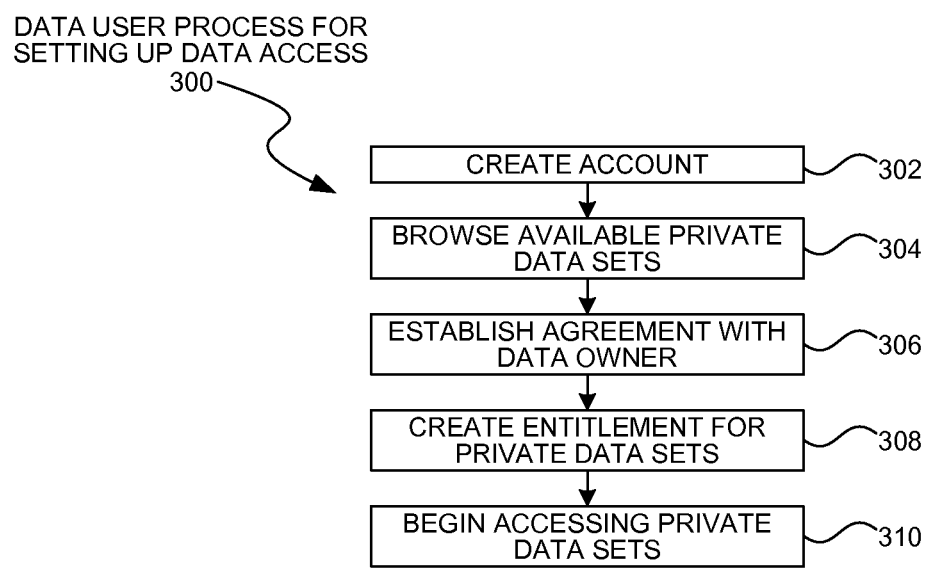
FIG. 3 is a flowchart of an embodiment showing a method for setting up data access.

FIG. 3 is a flowchart illustration of an embodiment 300 showing a method for setting up access to a private data set. Embodiment 300 is a simplified example of a method that may be performed by a data user to identify and prepare private data for use.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 is a simplified example of the steps performed when a data user may begin using private data. The operations of embodiment 300 may be performed using a subscription interface, such as the subscription manager 138 of embodiment 100.

A data user may establish an account in block 302. The account may include payment information that may be debited to meet the terms and conditions of any entitlement that may be established to private data sets.

The data user may browse available private data sets in block 304 and may establish an agreement in block 306 with the data owner to obtain access. An entitlement may be created in block 308 and stored with a data management system, which may begin permitting the data user to access the data in block 310.

Figure 4:
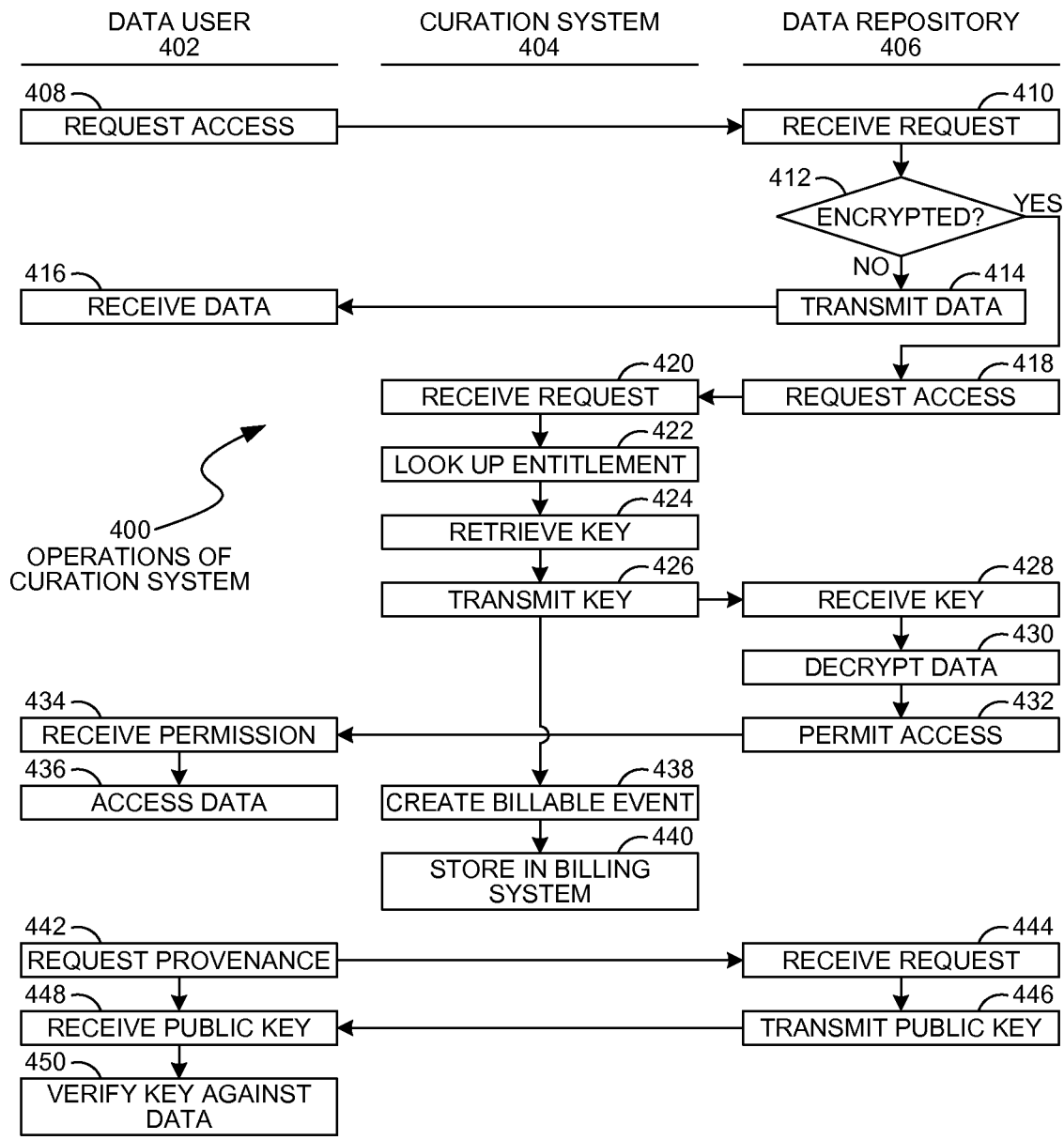
FIG. 4 is a flowchart of an embodiment showing a method for permitting access with a curation system.

FIG. 4 is a flowchart illustration of an embodiment 400 showing a method for interacting with and operating a curation system. The operations of a data user 402 may be illustrated in the left hand column. The operations of a curation system 404 may be illustrated in the center column, and the operations of a data repository 406 may be illustrated in the right hand column. The operations illustrated for a data user 402 illustrate operations performed by a device or software under the control of the data user 402.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 is a simplified example of some steps that may be performed when a data user uses private data. The curation system 404 and data repository 406 may interact to decrypt private data and permit access when the conditions of an entitlement are satisfied.

Embodiment 400 further illustrates a simplified interaction that may be performed in order to provide provenance for private data.

In block 408, a data user 402 may request access to a data repository 406, which may receive the request in block 410. If the request is not for encrypted data in block 412, the data may be transmitted in block 414 and received in block 416.

The operations of blocks 412 through 416 represent a case where the data stored in the data repository is freely available to the data user. Such a situation may occur when the data being accessed are owned by the data user or when the data are publically available.

If the data are encrypted in block 412, the data repository 406 may request access in block 418, which may be received by the curation system 404 in block 420.

The curation system 404 may look up any entitlement to determine whether or not the data user 402 may be granted access in block 422. If the data user 402 is granted access, the curation system 404 may retrieve an encryption key in block 424 and transmit the key in block 426 to the data repository 406. The data repository 406 may receive the key in block 428, decrypt the data in block 430, and permit access in block 432. The data user 402 may receive permission in block 434 and access the data in block 436.

In other embodiments, the decryption may be performed by the data user 402. In such an embodiment, the encryption key may be transmitted to the data user 402 and used by the data user 402 to decrypt the data. In some embodiments, the encryption key may be stored by the curation system 404 as an encrypted object, with the data user 402 having a second encryption key that can be used to decrypt the key held by the curation system 404.

After the curation system handles the encryption key look up in blocks 422 and 424, the curation system 404 may create a billable event in block 438 and store the billable event in a billing system in block 440.

In many embodiments, an entitlement may be created that charges a fee based on an access event. Some embodiments may, for example, charge a fee for each use. Other embodiments may charge a fixed fee for a certain number of accesses. Still other embodiments may permit unlimited accesses for a certain period of time after the first access. Various entitlements may be structured with different conditions.

In block 442, the data user 402 may request provenance for certain data. The request may be received by the data repository 406 in block 444. In response, the data repository 406 may transmit a public key in block 446 to the data user 402, which may receive the public key in block 448 and use the public key to verify against the encryption of the data in block 450.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
   a processor;
   memory coupled to the processor;
   a data repository stored in the memory, the data repository comprising a plurality of private data sets corresponding to different data providers;
   an encryption key repository stored in the memory, the encryption key repository comprising a plurality of encryption keys corresponding to the plurality of private data sets; and
   instructions stored in the memory, the instructions being executable by the processor to:
      access a first private data set in the data repository, wherein the first private data set is associated with a first access condition and is associated with a first data provider;
      access a second private data set in the data repository, wherein the second private data set is associated with a second access condition, wherein the second private data set is associated with a second data provider different from the first data provider, and wherein the second private data set is maintained separately from and outside of the first private data set;
      derive a new private data set from the first private data set and the second private data set, wherein the new private data set comprises a portion of the first private data set and a portion of the second private data set, and wherein the new private data set resides in the data repository;
      make the new private data set available in a marketplace;
      establish at least one entitlement for accessing the new private data set via the marketplace; and
      control access to the new private data set based on the at least one entitlement such that access to the portion of the first private data set included in the new private data set is associated with the first access condition and access to the portion of the second private data set included in the new private data set is associated with the second access condition, wherein controlling access to the new private data set comprises requesting at least one encryption key from the encryption key repository.

2. The system of claim 1, wherein the new private data set is associated with an access condition that defines a limited number of accesses to the portion of the first private data set.

3. The system of claim 1, wherein the new private data set is encrypted with an encryption key associated with the first private data set.

4. The system of claim 1, wherein the instructions configured to control access to the new private data set comprise instructions configured to cause the processor to decrypt the first private data set using an encryption key corresponding to the new private data set.

5. The system of claim 4, further comprising instructions configured to cause the processor to use the encryption key to access the portion of the first private data set from within the new private data set.

6. The system of claim 1, further comprising instructions configured to cause the processor to create a billable event associated with accessing the portion of the first private data set.

7. The system of claim 1, wherein the at least one entitlement for accessing the new private data set is established between a data owner of the first private data set and a data user.

8. A processor-implemented method, comprising:
   accessing a first private data set in a data repository, wherein the first private data set is associated with a first access condition and is associated with a first data provider, and wherein the data repository comprises a plurality of private data sets corresponding to different data providers;
   accessing a second private data set in the data repository, wherein the second private data set is associated with a second access condition, wherein the second private data set is associated with a second data provider different from the first data provider, and wherein the second private data set is maintained separately from and outside of the first private data set;
   deriving a new private data set from the first private data set and the second private data set, wherein the new private data set comprises a portion of the first private data set merged with a portion of the second private data set, and wherein the new private data set resides in the data repository;
   making the new private data set available in a marketplace;
   establishing at least one entitlement for accessing the new private data set via the marketplace; and
   controlling access to the new private data set based on the at least one entitlement such that access to the portion of the first private data set included in the new private data set is associated with the first access condition and access to the portion of the second private data set included in the new private data set is associated with the second access condition, wherein controlling access to the new private data set comprises requesting at least one encryption key from an encryption key repository that comprises a plurality of encryption keys corresponding to the plurality of private data sets.

9. The method of claim 8, wherein deriving the new private data set comprises deriving a data set associated with an access condition that defines a limited number of accesses to the portion of the first private data set.

10. The method of claim 8, wherein deriving the new private data set comprises deriving a data set that is encrypted with an encryption key associated with the first private data set.

11. The method of claim 8, wherein controlling access to the portion of the first private data set comprises preventing unauthorized access to the portion of the first private data set by requiring use of an encryption key associated with the first private data set to access the new private data set.

12. The method of claim 11, further comprising using the encryption key to access the portion of the first private data set from within the new private data set.

13. The method of claim 8, further comprising creating a billable event associated with accessing the portion of the first private data set.

14. The method of claim 8, wherein the at least one entitlement for accessing the new private data set is established between a data owner of the first private data set and a data user.

15. A computer-program product for use at a computer system, the computer-program product comprising one or more computer storage devices having stored thereon computer-executable instructions that, when executed at a processor, cause the computer system to perform a method, including the following:
    access a first private data set in a data repository, wherein the first private data set is associated with a first access condition and is associated with a first data provider, and wherein the data repository comprises a plurality of private data sets corresponding to different data providers;
    access a second private data set in the data repository, wherein the second private data set is associated with a second access condition, wherein the second private data set is associated with a second data provider different from the first data provider, and wherein the second private data set is maintained separately from and outside of the first private data set;
    derive a new private data set from the first private data set and the second private data set, wherein the new private data set comprises a portion of the first private data set transformed with a portion of the second private data set, and wherein the new private data set resides in the data repository;
    make the new private data set available for remote access through a marketplace;
    establish at least one entitlement for accessing the new private data set via the marketplace; and
    control remote access to the new private data set through the marketplace based on the at least one entitlement such that access to the portion of the first private data set included in the new private data set is associated with the first access condition and access to the portion of the second private data set included in the new private data set is associated with the second access condition, wherein controlling access to the new private data set comprises requesting at least one encryption key from an encryption key repository that comprises a plurality of encryption keys corresponding to the plurality of private data sets.

16. The computer-program product of claim 15, wherein the new private data set is associated with an access condition that defines a limited number of accesses to the portion of the first private data set.

17. The computer-program product of claim 15, wherein the new private data set is encrypted with an encryption key associated with the first private data set.

18. The computer-program product of claim 15, wherein controlling access to the new private data set comprises preventing unauthorized access to the portion of the first private data set by requiring use of an encryption key associated with the first private data set to access the new private data set; and
    further comprising computer-executable instructions that, when executed, cause the computer system to use the encryption key to access the portion of the first private data set from within the new private data set.

19. The computer-program product of claim 15, further comprising computer-executable instructions that, when executed, cause the computer system to create a billable event associated with accessing the portion of the first private data set.

20. The computer-program product of claim 15, wherein the at least one entitlement for accessing the new private data set is established between a data owner of the first private data set and a data user.

* * * * *